(12) United States Patent
Lee et al.

(10) Patent No.: US 8,582,679 B2
(45) Date of Patent: Nov. 12, 2013

(54) METHOD OF TRANSMITTING OF DATA AND CONFIGURING A CODEBOOK IN MULTI ANTENNA SYSTEM

(75) Inventors: Moon Il Lee, Anyang-si (KR); Bin Chul Ihm, Anyang-si (KR); Hyun Soo Ko, Anyang-si (KR); Wook Bong Lee, Anyang-si (KR); Jin Hyuk Jung, Anyang-si (KR); Jae Wan Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 12/666,777

(22) PCT Filed: Jun. 24, 2008

(86) PCT No.: PCT/KR2008/003593
§ 371 (c)(1),
(2), (4) Date: Nov. 18, 2010

(87) PCT Pub. No.: WO2009/002078
PCT Pub. Date: Dec. 31, 2008

(65) Prior Publication Data
US 2011/0051834 A1 Mar. 3, 2011

Related U.S. Application Data (60) Provisional application No. 60/946,376, filed on Jun. 26, 2007.

(30) Foreign Application Priority Data

Sep. 5, 2007 (KR) .................. 10-2007-0089966

(51) Int. Cl.
*H04L 1/02* (2006.01)

(52) U.S. Cl.
USPC .......... 375/267; 375/260; 375/284; 375/285; 375/295; 375/296

(58) Field of Classification Search
USPC ................... 375/259–285, 295–315
See application file for complete search history.

(56) References Cited

U.S. PATENT DOCUMENTS

| | | | |
|---|---|---|---|
| 2006/0072604 A1 | 4/2006 | Sutivong et al. | |
| 2007/0249401 A1* | 10/2007 | Kim et al. | 455/562.1 |
| 2008/0049709 A1* | 2/2008 | Pan et al. | 370/344 |
| 2008/0108310 A1* | 5/2008 | Tong et al. | 455/69 |

FOREIGN PATENT DOCUMENTS

| | | |
|---|---|---|
| WO | 2004/038988 | 5/2004 |
| WO | 2007/049760 | 5/2007 |

* cited by examiner

*Primary Examiner* — Shuwang Liu
*Assistant Examiner* — Ross Varndell
(74) *Attorney, Agent, or Firm* — Lee, Hong, Degerman, Kang & Waimey (57) ABSTRACT

Methods of controlling a transmission power and configuring a codebook in a multi-antenna system to solve a transmission power unbalance between antennas are disclosed. The method of transmitting data in a multi-antenna system includes (A) transmitting one or more pilot signals within a first symbol region through a first antenna unit, and (B) transmitting one or more pilot signals within a second symbol region through a second antenna unit, wherein data within the first symbol region is transmitted through the second antenna unit, and data within the second symbol region is transmitted through the first antenna unit. According to the present invention, since a transmission power unbalance between antennas is solved, a transmission power can be uniformly assigned to each antenna and channel estimation can be easily performed. Moreover, a power amplifier having a uniform amplification range can be used and designed.

6 Claims, 7 Drawing Sheets

METHOD OF TRANSMITTING OF DATA AND CONFIGURING A CODEBOOK IN MULTI ANTENNA SYSTEM

CROSS-REFERENCE TO RELATED APPLICATIONS

This application is the National Stage filing under 35 U.S.C. §371 of International Application No. PCT/KR2008/003593, filed on Jun. 24, 2008, which claims the benefit of earlier filing date and right of priority to Korean Application No. 10-2007-0089966, filed on Sep. 5, 2007, and also claims the benefit of U.S. Provisional Application Ser. No. 60/946,376, filed on Jun. 26, 2007.

TECHNICAL FIELD

The present invention relates to a multi-antenna system, and more particularly, to methods of controlling a transmission power and configuring a codebook to solve a transmission power unbalance between antennas.

BACKGROUND ART

Recently, an orthogonal frequency division multiplexing (OFDM)/multiple-input multiple-output (MIMO) system has attracted attention as a broadband wireless mobile communication technology. Especially, the MIMO technology can increase in proportion to the number of antennas spectral efficiency which is difficult to achieve an existing single-input single-output (SISO) communication technology.

Hereinafter, the OFDM/orthogonal frequency division multiplexing access (OFDMA) system is described in brief.

The OFDM technique is a modulation scheme for multiplexing a high-speed transmission signal to a large number of orthogonal narrowband sub-carriers. In the OFDM technique, a data sequence having a high transmission rate is divided into multiple data sequences having a low transmission rate and these data sequences are simultaneously transmitted by using a plurality of sub-carriers. That is, the OFDM is a special form of a multi-carrier transmission technology for simultaneously transmitting data streams in parallel over a plurality of sub-channels.

The OFDM technique is one of multiplexing technologies in terms of simultaneously transmitting a high-speed original data sequence of one channel over multiple channels and also one of modulation technologies in terms of separately transmitting the data stream into multiple carriers. Waveforms of respective sub-carriers are orthogonal in a time axis but overlap in a frequency axis.

The OFDM technique may be used in a field of a wireless LAN, that is, 802.11a, 802.11g, 802.16, etc. and may be applicable to a field of mobile communication such as the fourth generation (4G) system beyond IMT-2000, a high bit-rate digital subscriber line (HDSL), an asymmetric digital subscriber line (ADSL), and a wireless asynchronous transfer mode (ATM).

There are many types of multiple access. The multiple access is a transmission scheme term representing that communication resources are shared, that is, a given time span, space, and a frequency band are commonly used by many users. Namely, a limited resource such as a transmission channel is evenly shared by a plurality of nodes efficiently. Meanwhile, the multiple access may be another form of multiplexing. The multiple access includes fixed assignment, dynamic assignment, wired assignment, etc.

The fixed assignment includes code division multiple access (CDMA), frequency division multiple access (FDMA), time division multiple access (TDMA), and spatial division multiple access (SDMA). In exemplary embodiments of the present invention, an OFDMA technology among multiple access schemes is used.

In the OFDMA technology, all effective sub-carriers are not used by a single user. Instead, a set of the effective sub-carriers is differently split and assigned to a plurality of users.

In the OFDMA technology, resources are flexibly assigned to users in the same cell by using different sub-carrier sets. Moreover, a sub-channel having a part of the sub-carrier sets as one set resources is used by separately assigning resources by 2-dimension in time and frequency regions. Furthermore, it is possible to optimize a channel capacity by assigning sub-carriers on the frequency region according to a transmission speed demanded by a user. That is, sub-channels are dynamically assigned according to a user's demand and the number of sub-carriers assigned according to the transmission speed demanded by the user may be varied. The OFDMA technology can reduce interference within a cell since different sub-carriers are assigned to users.

Hereinafter, MIMO technology is described in brief.

The MIMO technology is a multi-antenna technology for performing high-speed communication by using multiple antennas. The MIMO technology includes a spatial multiplexing scheme and a spatial diversity scheme according to whether the same data is transmitted.

The spatial multiplexing scheme is to simultaneously transmit different data signals through multiple transmit-receive antennas. A transmitting side transmits different data signals through transmit antennas. A receiving side classifies the transmitted data signals by appropriate interference elimination and signal processing, thereby improving a transmission rate by as much as the number of transmit antennas.

The spatial diversity scheme is to obtain transmit diversity by transmitting the same data through multiple transmit antennas and is one of space-time channel coding techniques. The spatial diversity scheme can maximize a transmit diversity gain (performance gain) by transmitting the same data through multiple transmit antennas. However, the spatial diversity scheme is not a method of improving a transmission rate but a method of improving the reliability of transmission caused by a diversity gain.

The MIMO technology includes an open loop, such as Bell labs layered space-time (BLAST) and space-time trellis code (STTC), and a closed loop such as transmit antenna array (TxAA), according to whether channel information is fed back from a receiving side to a transmitting side.

Figure 1:
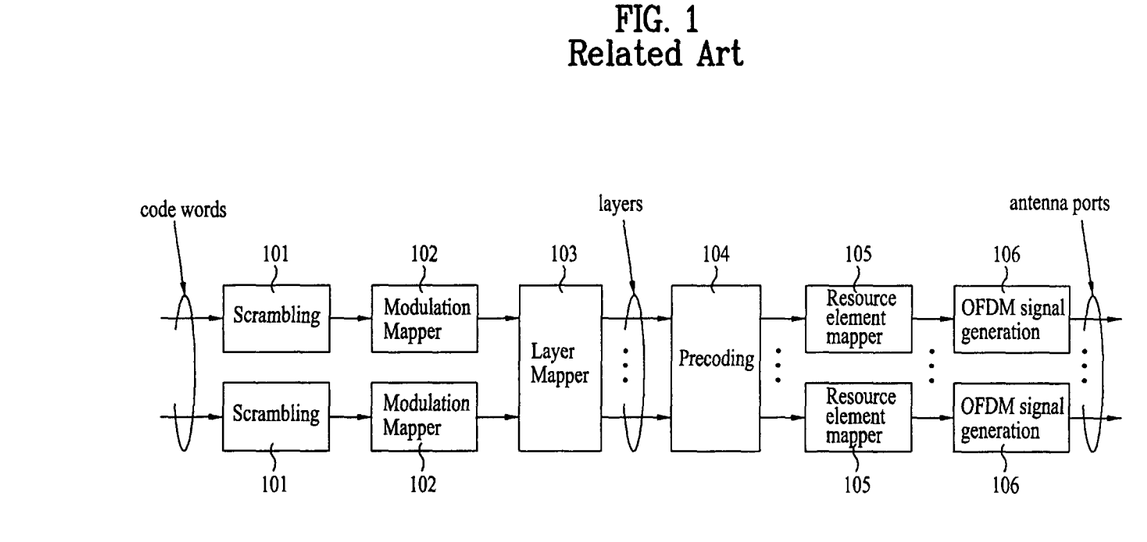
FIG. 1 is a block diagram illustrating a structure of an OFDM/MIMO transmitter using a precoding scheme.

FIG. 1 is a block diagram illustrating a structure of an OFDM/MIMO transmitter using a precoding technique.

In FIG. 1, the same reference numerals designate the same or like parts.

In a wireless communication system environment, a fading phenomenon may occur due to a multi-path time delay. A process of restoring a transmission signal by compensating for a signal generated by an abrupt environment variation due to fading is called channel estimation.

Referring to FIG. 1, transmitted data is restored at a receiving side with a channel estimation value estimated by an additional pilot channel (or a reference channel). Accordingly, when a transmitting side transmits an OFDM signal, it is important to configure the pilot channel for channel estimation so that the receiving side can restore a signal. To construct a MIMO channel, it is necessary to estimate a channel for each antenna and therefore a corresponding pilot signal is inserted for each antenna into a time axis and a frequency axis with a regular pattern.

In FIG. 1, coded signals inputted to an OFDM/MIMO transmitter is arbitrarily mixed in a scrambling module 101 and modulated in a modulation mapper 102 to signals suitable for transmission. The modulated signals are mapped to each transmission layer in a layer mapper 103 and beam-formed in a precoding module 104 to support multi-layer transmission in a MIMO system. For channel estimation, a resource element mapper 105 inserts corresponding pilot signals for respective antennas into the modulated signals with a regular pattern. An OFDM signal generator 106 generates OFDM signals, inserts the OFDM signals into the modulated signals, and then transmits the OFDM signals through antenna ports.

For channel estimation, a reference signal which is known to a transmitter and a receiver is used. The reference signal is also called a pilot signal. In mapping a general reference signal, a method of assigning the reference signal between data sub-carriers is used to increase an amount of data transmission.

In the MIMO system, a transmission power of the reference signal is transmitted by being boosted higher than a data sub-carrier in order to easily estimate a channel. In this case, however, a transmission power unbalance between antennas may be incurred. If power magnitudes of power amplifiers between antennas in a base station are different, a design cost may be increased and it may be difficult to perform channel estimation during data transmission.

DISCLOSURE

Technical Problem

An object of the present invention devised to solve the problem lies on providing a method of uniformly assigning a transmission power to each antenna in a MIMO system.

Another object of the present invention devised to solve the problem lies on providing a method of configuring a codebook for uniformly assigning a transmission power to each antenna in order to solve nonuniform assignment of a transmission power which may occur in each antenna when boosting a power of a reference signal for efficient channel estimation.

Technical Solution

The object of the present invention can be achieved by providing methods of transmitting data and configuring a codebook to solve a transmission power unbalance between antennas in a multi-antenna system.

In one aspect of the present invention, provided herein is a method of transmitting data in a multi-antenna system. The method includes (A) transmitting one or more pilot signals within a first symbol region through a first antenna unit, and (B) transmitting one or more pilot signals within a second symbol region through a second antenna unit, wherein prescribed number of data within the first symbol region is transmitted through the second antenna unit, and prescribed number of data within the second symbol region is transmitted through the first antenna unit.

The method may further include (C) puncturing data of a prescribed number among the data within the first symbol region and the second symbol region, and (D) adding a transmission power corresponding to the punctured data to transmission powers corresponding to the pilot signals. In this case, the prescribed number among the data may be half of a number of the pilot signals.

In the steps (A) and (B), the first symbol region and the second symbol regions may include 12 sub-carriers, respectively and 4 pilot signals may be transmitted through the first and second symbol regions, and in the step (C), the prescribed number may be two.

In another aspect of the present invention, provided herein is a method of configuring a codebook in a multi-antenna system. The method includes generating a first precoding matrix which is set to transmit data through a first antenna unit, and a second precoding matrix which is set to transmit the data through a second antenna unit, and configuring a codebook including the first precoding matrix and the second precoding matrix, wherein the data is transmitted through the second antenna unit by using the second precoding matrix in a first symbol region, and the data is transmitted through the first antenna unit by using the first precoding matrix in a second symbol region.

Matrixes generated by multiplying the first and second precoding matrixes by Hermitian matrixes of the first and second precoding matrixes, respectively, may be diagonal matrixes.

The first and second precoding matrixes may be generated by changing a sign of one of elements of each of the first and second precoding matrixes.

Advantageous Effects

The present invention has the following advantages.

First, since a transmission power unbalance between antennas is solved in a data channel structure when using a boosting method for a reference signal and using a newly configured codebook, a transmission power can be uniformly assigned to each antenna.

Second, since the transmission power is uniformly assigned to each antenna, channel estimation can be efficiently performed, a cost can be saved during design of antennas, and a power amplifier having a uniform amplification range can be used and designed.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The present invention provides methods of transmitting data and configuring a codebook to solve a transmission power unbalance between antennas for easy channel estimation in a multi-antenna system.

Reference will now be made in detail to the exemplary embodiments of the present invention, examples of which are illustrated in the accompanying drawings. In the following description of the present invention, a detailed description of known functions and configurations incorporated herein will be omitted when it may make the subject matter of the invention rather unclear.

Figure 2:
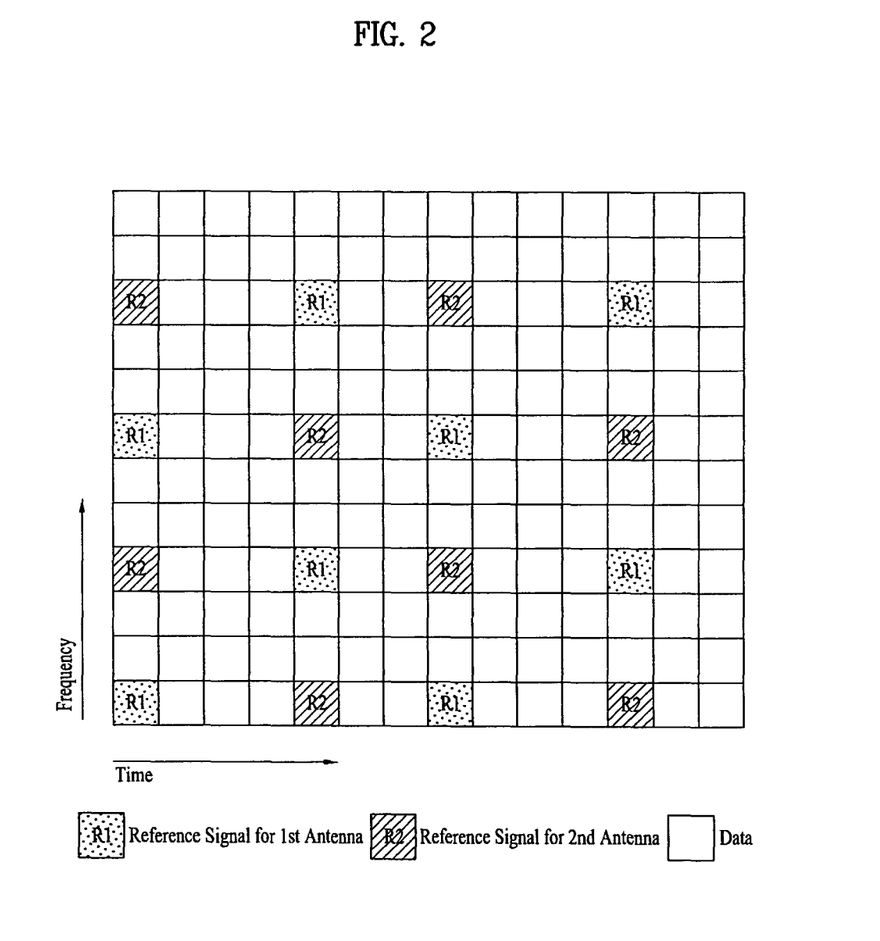
FIG. 2 illustrates a mapping structure of reference signals when there are two transmit-receive antennas.

FIG. 2 illustrates a mapping structure of reference signals when there are two transmit-receive antennas.

Referring to FIG. 2, blocks denoted by R1 designate resource blocks including a reference signal RS (or a pilot signal) for a first antenna, and blocks denoted by R2 designate resource blocks including a reference signal for a second antenna. Blocks having no reference symbols indicate resource blocks including a data signal.

The horizontal and vertical axes denote time and frequency, respectively. The entire block is a set of resource blocks expressed in the form of 12×14, 14×12, or 14×14. In exemplary embodiments of the present invention, 12×14 blocks are described by way of example. In each resource block, the horizontal axis indicates an orthogonal frequency division multiplexing (OFDM) symbol as the unit of time and the vertical axis indicates a sub-carrier as the unit of frequency. Namely, it is assumed that the total resource block is comprised of 14 OFDM symbols each consisting of 12 sub-carriers.

The respective reference signals are transmitted at intervals of a prescribed time in order to consider the influence of frequency-selective fading and time-axis fading and alternate with each other to uniformly estimate channels between antennas.

However, reference signals may be assigned in order to increase the amount of data transmission and powers of the reference signals may be boosted higher than a data sub-carrier in order to easily estimate channels.

Figure 3:
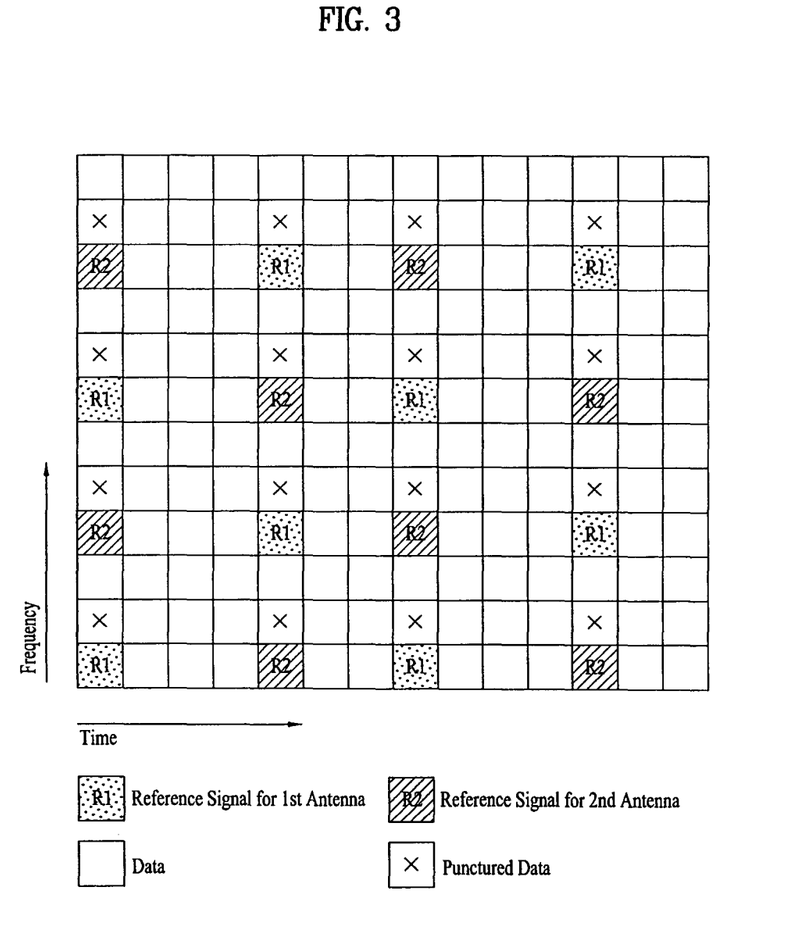
FIG. 3 illustrates a mapping structure of reference signals when powers of the reference signals are boosted according to an exemplary embodiment of the present invention.

FIG. 3 illustrates a mapping structure of reference signals when powers of the reference signals are boosted according to an exemplary embodiment of the present invention.

FIG. 3 shows a MIMO system having two transmit-receive antennas and has a configuration similar to FIG. 2 except that data signals are punctured and thus powers of the reference signals are boosted in order to easily estimate channels. In FIG. 3, 12×14 resource blocks are shown by way of example. In each resource block, the horizontal axis indicates an OFDM symbol as the unit of time and the vertical axis indicates a sub-carrier as the unit of frequency.

Referring to FIG. 3, a reference symbol 'x' designates puncturing of a data signal. The power of the reference signal can be boosted by assigning a power used for transmitting the punctured data signal when transmitting the reference signal of each symbol interval. Puncturing means elimination of specific data to increase a power of the reference signal by as much as a power assigned to the specific data. Boosting means raising the power of the reference signal by as much as a power assigned to the punctured specific data.

A power of a reference signal R1 in the first symbol is twice an originally assigned power because a power of a punctured data signal is added to the originally assigned power. Similarly, a power of a reference signal R2 in the first symbol is twice an originally assigned power because a power of a punctured data signal is added to the originally assigned power. Assuming that the other data signals in the first symbol are uniformly transmitted through first and second antennas, powers of the first and second antennas can be uniformly transmitted.

If the reference signals are boosted by 3 dB (that is, twice the originally assigned power) by the above-mentioned method, the power of the reference signal is higher than a power assigned to the data signal, thereby easily processing channel estimation. In other words, it is possible to restore channels by using the reference signals R1 and R2.

Figure 4:
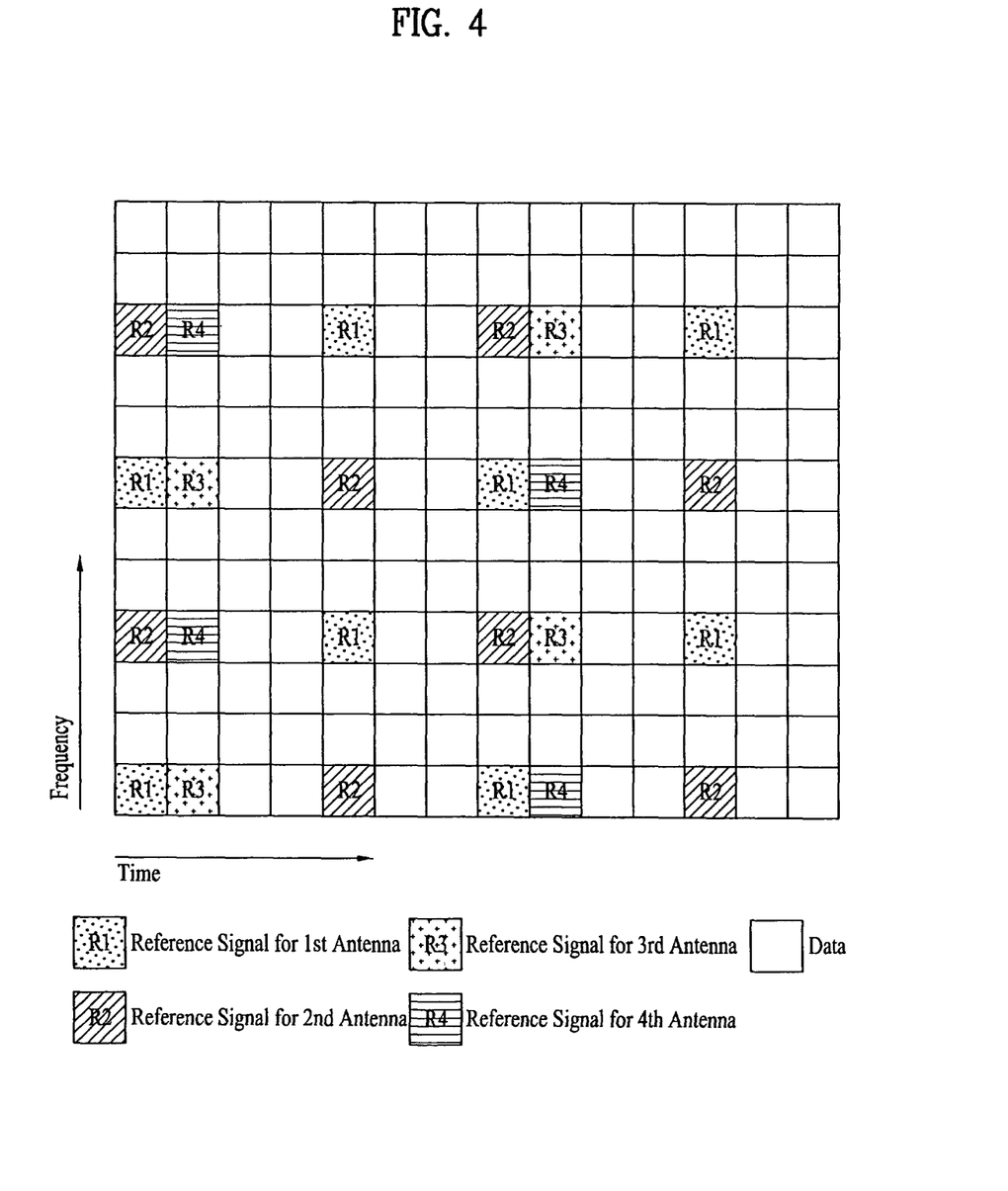
FIG. 4 illustrates a mapping structure of reference signals and a data mapping method when there are 4 transmit-receive antennas according to an exemplary embodiment of the present invention.

FIG. 4 illustrates a mapping structure of reference signals and a data mapping method when there are 4 transmit-receive antennas according to an exemplary embodiment of the present invention.

In FIG. 4, blocks denoted by R1 designate reference signals RS (or pilot signals) for a first antenna, blocks denoted by R2 designate reference signals for a second antenna, blocks denoted by R3 designate reference signals for a third antenna, and blocks denoted by R4 designate reference signals for a fourth antenna. Blocks having no reference symbols are blocks indicating data signals. The horizontal and vertical axes denote time and frequency, respectively.

In FIG. 4, 12×14 resource blocks for data transmission are shown by way of example. In each resource block, the horizontal axis indicates an OFDM symbol as the unit of time and the vertical axis indicates a sub-carrier as the unit of frequency.

FIG. 4 shows a MIMO system including 4 antennas. The respective reference signals are transmitted at intervals of a prescribed time in order to consider the influence of frequency-selective fading and time-axis fading and alternate with each other to uniformly estimate channels between antennas.

Figure 5:
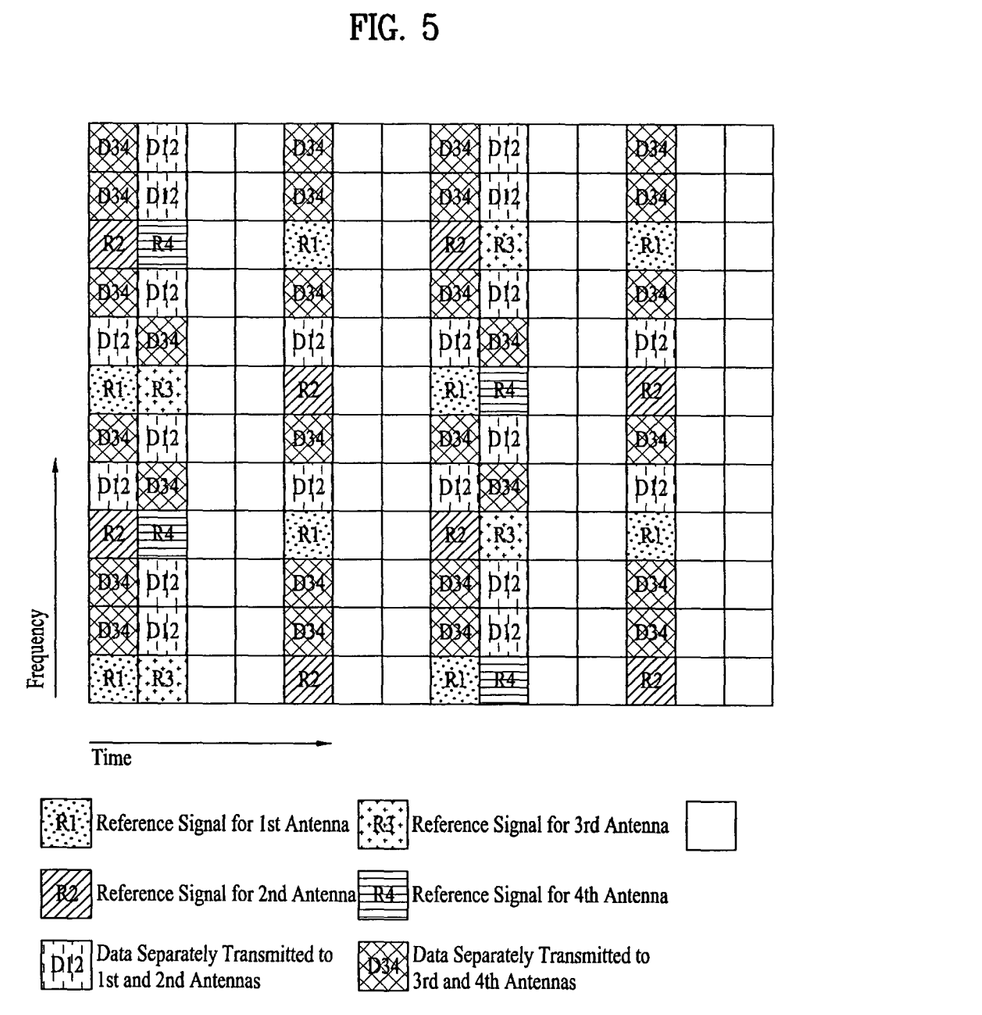
FIG. 5 illustrates a mapping structure of reference signals when the reference signals are not boosted and only a data transmitting method is modified according to an exemplary embodiment of the present invention.

FIG. 5 illustrates a mapping structure of reference signals when the reference signals are not boosted and only a data transmitting method is modified according to an exemplary embodiment of the present invention.

In FIG. 5, blocks denoted by R1 designate reference signals RS (or pilot signals) for a first antenna, and blocks denoted by R2 designate reference signals for a second antenna. Blocks denoted by R3 designate reference signals for a third antenna, and blocks denoted by R4 designate reference signals for a fourth antenna. Blocks having no reference symbols are blocks indicating data signals. Blocks denoted by D12 indicate separately transmitting the same data through first and second antennas, and blocks denoted by D34 indicates separately transmitting the same data through third and fourth antennas.

The horizontal and vertical axes designate time and frequency, respectively, and 12×14 resource blocks for data transmission are described by way of example. In each resource block, the horizontal axis indicates an OFDM symbol as the unit of time and the vertical axis indicates a sub-carrier as the unit of frequency.

In the first symbol, the first and second antennas transmit reference signals.

It is assumed in FIG. 5 that a sum of powers in the first symbol including reference signals is 1. In the first symbol, the number of reference signals R1 assigned to the first antenna is two, and the number of reference signals R2 assigned to the second antenna is also two. Therefore, powers assigned to the first and second antennas are 2/12, respectively. Then 8 data signals are left and each data signal should be appropriately distributed to each antenna to solve an unbalance problem between the respective antennas.

That is, a power of 2/24 is assigned to the first antenna and a power of 2/24 is assigned to the second antenna by two data signals D12. Accordingly, powers of 3/12 are assigned to the first and second antennas, respectively. Moreover, a power of 6/24 is assigned to the third antenna and a power of 6/24 is assigned to the fourth antenna by 6 data signals D34. Therefore, powers of 3/12 are assigned to the first to fourth antennas, respectively.

According to the exemplary embodiment of the present invention, a power unbalance between antennas which has been pointed out as a problem in a construction of an existing downlink shared data channel can be solved. Consequently, it is possible to use and design a power amplifier having a uniform amplification range at a transmitting stage.

However, it may be considered that a power of a reference signal is boosted higher than a data sub-carrier for easy channel estimation. In this case, it is necessary to distribute a data transmission power in a different way from the above-described exemplary embodiment of the present invention.

Figure 6:
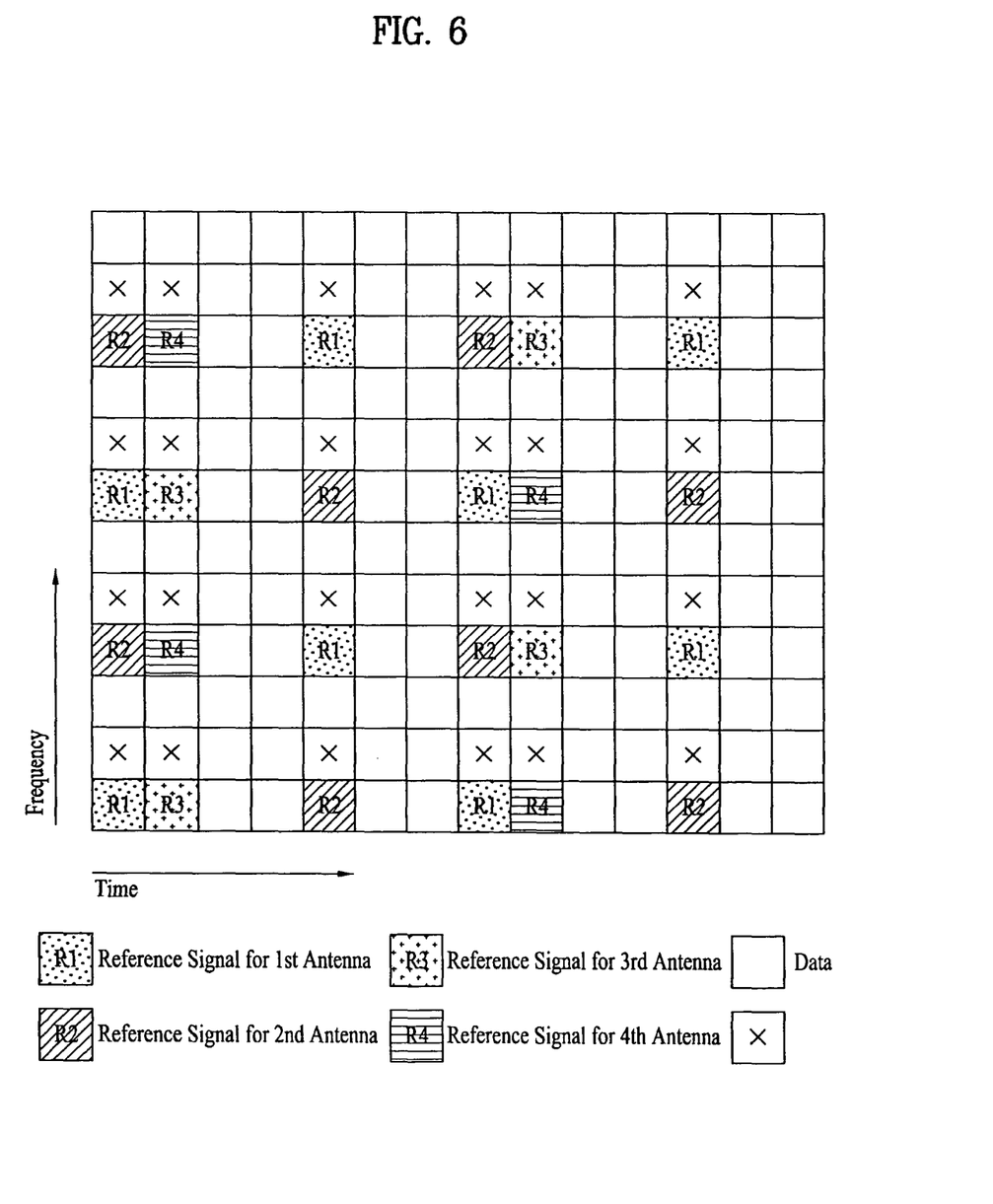
FIG. 6 illustrates a mapping structure of reference signals when powers of the reference signals are boosted according to an exemplary embodiment of the present invention.

FIG. 6 illustrates a mapping structure of reference signals when powers of the reference signals are boosted according to an exemplary embodiment of the present invention.

FIG. 6 shows a MIMO system having 4 transmit-receive antennas and has a configuration similar to FIG. 4 except that data signals are punctured and thus powers of the reference signals are boosted in order to easily estimate channels. In FIG. 6, 12×14 resource blocks are described by way of example. In each resource block, the horizontal axis indicates an OFDM symbol as the unit of time and the vertical axis indicates a sub-carrier as the unit of frequency.

Referring to FIG. 6, a reference symbol 'x' designates puncturing of a data signal. The power of the reference signal can be boosted by assigning the power used for transmitting the punctured data signal when transmitting the reference signal of each symbol interval. The horizontal and vertical axes designate time and frequency, respectively.

If the powers of the reference signals are boosted higher than a prescribed magnitude by using 4 antennas, a power of a data sub-carrier should be decreased. In this case, if a transmission power is assigned to each antenna by applying a general codebook, a transmission power unbalance between antennas may be generated. For example, if the reference signal is boosted by as much as 3 dB (that is, twice an original power), a transmission power unbalance between antennas may be incurred.

For example, it is assumed that a sum of powers in the first symbol including reference signals is 1. In the first symbol, the number of reference signals R1 assigned to the first antenna is two and powers for two data signals are boosted to the reference signals R1 by puncturing the data signals. Therefore, a power assigned to the first antenna is 4/12. In the first symbol, the number of reference signals R2 assigned to the second antenna is two and powers for two data signals are boosted to the reference signals R2 by puncturing the data signals. Therefore, a power assigned to the second antenna is also 4/12.

In this case, since 4 data signals are punctured and 4 data signals are left, the 4 data signals are transmitted through 4 antennas. Consequently, powers of 5/12 are assigned to first and second antennas, respectively, and powers of 1/12 are assigned to third and fourth antennas, respectively.

Meanwhile, when 4 data signals are punctured and 4 data signals are left, all the 4 data signals may be transmitted through the third and fourth antennas to which the reference signals are not transmitted. Then powers of 4/12 are assigned to the first and second antennas, respectively, and powers of 2/12 are assigned to the third and fourth antennas, respectively.

In the second symbol, two reference signals R3 and two reference signals R4 are assigned to the third and fourth antennas, respectively. Four data signals are punctured to boost transmission powers of the respective reference signals.

A transmission power is assigned to each antenna in the same way as in the first symbol. That is, powers of 5/12 are assigned to the third and fourth antennas, respectively, and powers of 1/12 are assigned to the first and second antennas, respectively. Moreover, in the case where 4 data signals are punctured and 4 data signals are left, all the 4 data signals may be transmitted through the first and second antennas to which the reference signals are not transmitted. Then powers of 4/12 are assigned to the third and fourth antennas, respectively, and powers of 2/12 are assigned to the first and second antennas, respectively.

As described above, in the symbol including reference signals, a transmission power assigned to an antenna through which the reference signal is transmitted is 5/12 or 4/12, and a transmission power assigned to an antenna through which a data signal is transmitted is 1/12 or 2/12. Although it is easy to estimate channels, a transmission power unbalance between antennas may, occur.

Therefore, it is necessary to change a boosted degree of each reference signal. Further, it is also necessary to consider a method of solving the power unbalance by adjusting a transmission power assigned to each antenna by a new configuration of a generally used codebook structure.

Figure 7:
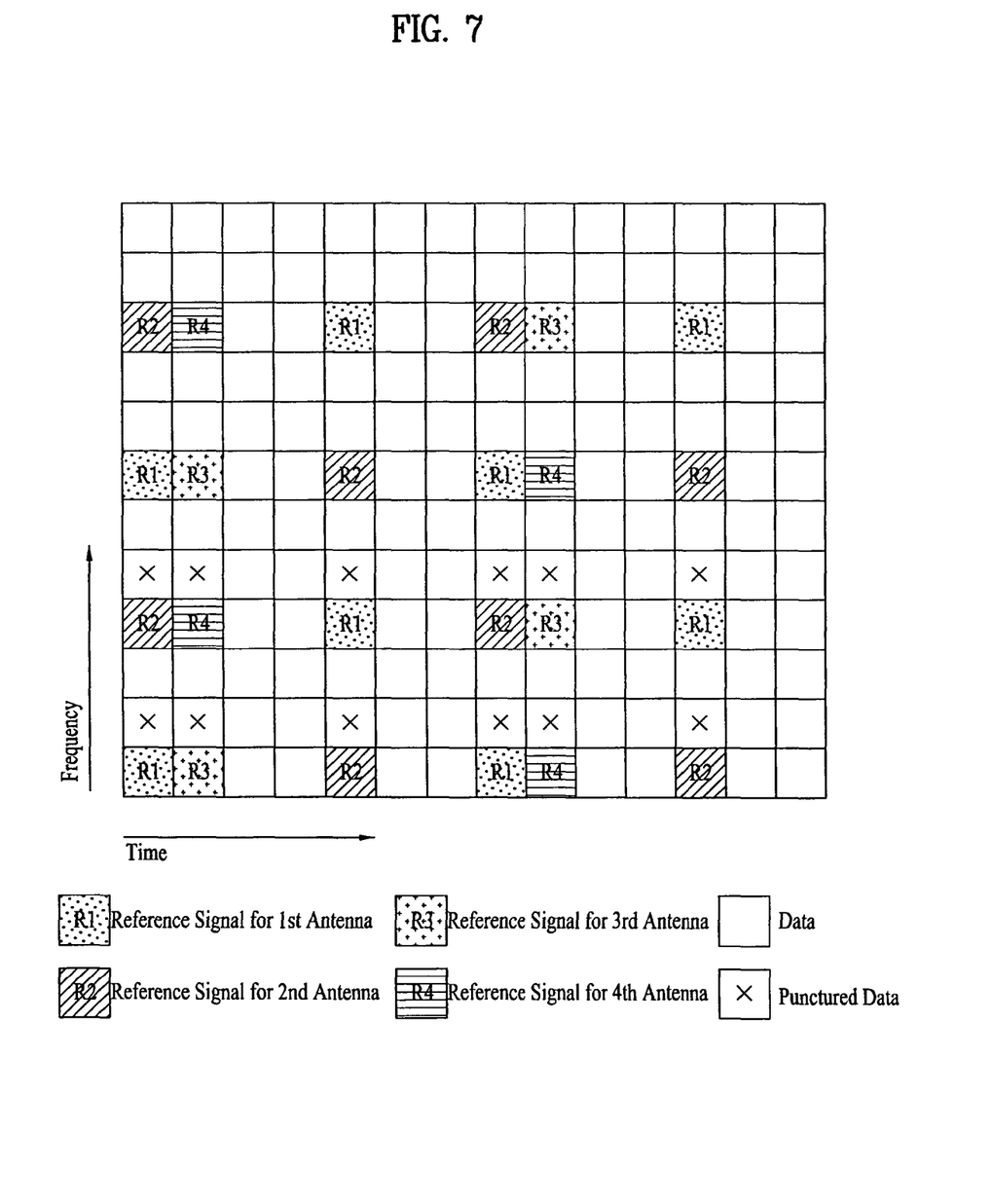
FIG. 7 illustrates a method of boosting powers of reference signals when there are 4 transmit-receive antennas according to an exemplary embodiment of the present invention.

FIG. 7 illustrates a method of boosting powers of reference signals when there are 4 transmit-receive antennas according to an exemplary embodiment of the present invention.

In FIG. 7, blocks denoted by R1 designate reference signals RS (or pilot signals) for a first antenna, and blocks denoted by R2 designate reference signals for a second antenna. Blocks denoted by R3 designate reference signals for a third antenna, and blocks denoted by R4 designate reference signals for a fourth antenna. Blocks having no reference symbols are blocks indicating data signals.

Blocks designated by a reference symbol 'x' indicate puncturing of a data signal. A power of the reference signal can be boosted by assigning a power used for transmitting the punctured data signal when transmitting the reference signal of each symbol interval. In FIG. 7, an example of puncturing the data signal is shown and other puncturing forms may be performed.

The horizontal and vertical axes denote time and frequency, respectively, and 12×14 resource blocks are described by way of example. In each resource block, the horizontal axis indicates an OFDM symbol as the unit of time and the vertical axis indicates a sub-carrier as the unit of frequency.

If a power of a reference signal is boosted higher than a prescribed magnitude by using 4 antennas, a power assigned to a data signal should be decreased. Hereinafter, methods of raising the power of the reference signal, appropriately lowering the power of the data signal, and configuring a codebook assigned to each antenna are described.

It is assumed that a magnitude of a power assigned to each sub-carrier is the same and a sum of powers assigned to one symbol is 1. Moreover, it is assumed that the boosted magnitude of the power of the reference signal is 1.76 dB, that is, 1.5 times an original power of the reference signal.

In the first symbol, the number of reference signals assigned to a first antenna is two and the number of reference signals assigned to a second antenna is also two. Two data signals are punctured in the first symbol to equally distribute a power assigned to a corresponding signal to each reference signal. For transmission of a pilot signal in the first symbol, a power assigned to the first antenna is 3/12 and a power assigned to the second antenna is 3/12. At this time, powers for the other data signals are equally distributed to 4 antennas by using a general codebook. Therefore, powers assigned to the first and second antennas are 4.5/12, respectively, and powers assigned to third and fourth antennas are 1.5/12, respectively.

In the second symbol, two reference signals are assigned to the third antenna and two reference signals are assigned to the fourth antenna. Two data signals are punctured in the second symbol to equally distribute a power assigned to a corresponding signal to each reference signal. For transmission of a pilot signal in the second symbol, powers assigned to the third and fourth antennas are 3/12, respectively. In this case, powers for the other data signals are equally distributed to 4 antennas. Therefore, powers assigned to the third and fourth antennas are 4.5/12, respectively, and powers assigned to the first and second antennas are 1.5/12, respectively.

In the other symbols including the reference signals, powers are assigned to each antenna as in the first and second symbols.

However, in a MIMO system including 4 antennas, if the powers of the reference signals are raised and the powers of the other data signals are assigned to each antenna by using a general codebook, there still remains a power unbalance between antennas. Accordingly, there is needed a method of generating a codebook for uniformly assigning a transmission power to each antenna by increasing the powers of the reference signals and appropriately distributing the transmission powers of the other data signals in correspondence to the increased power.

Hereinafter, a method of configuring a codebook structure in FIG. 7 to reduce the power unbalance between antennas is described.

1. Rank-1 Transmission

In a 4×1 codebook for 4 antennas, a structure for distributing transmission powers of data signals to third and fourth antennas in symbols including reference signals R1 and R2 is expressed by the following Equation 1.

$$W_1 = \begin{bmatrix} 0 & 0 & 0 & 0 \\ 0 & 0 & 0 & 0 \\ 0 & 0 & 1 & 0 \\ 0 & 0 & 0 & 1 \end{bmatrix} \begin{bmatrix} 1 \\ 1 \\ 1 \\ 1 \end{bmatrix} = \begin{bmatrix} 0 \\ 0 \\ 1 \\ 1 \end{bmatrix} \quad \text{[Equation 1]}$$

In a 4×1 codebook for 4 antennas, a structure for distributing transmission powers of data signals to first and second antennas in symbols including reference signals R3 and R4 is expressed by the following Equation 2.

$$W_2 = \begin{bmatrix} 1 & 0 & 0 & 0 \\ 0 & 1 & 0 & 0 \\ 0 & 0 & 0 & 0 \\ 0 & 0 & 0 & 0 \end{bmatrix} \begin{bmatrix} 1 \\ 1 \\ 1 \\ 1 \end{bmatrix} = \begin{bmatrix} 1 \\ 1 \\ 0 \\ 0 \end{bmatrix} \quad \text{[Equation 2]}$$

That is, rank-1 is the case where there is one data stream transmitted through each antenna. In FIG. 7, when constructing the codebook as shown in Equation 1 and Equation 2 after two data signals are punctured and transmission powers of reference signals are boosted by 1.5 times, a transmission power assigned to each antenna is as follows.

In the first symbol, if the transmission powers of the reference signals R1 and R2 are boosted to 1.5 times, the transmission powers assigned to the first and second antennas are 3/12, respectively. When the transmission power of the data signal is assigned to each antenna by using the codebook constructed as shown in Equation 1, the transmission powers assigned to the first and second antennas are 0, respectively, and the transmission powers assigned to the third and fourth antennas are 3/12, respectively. Thus since the transmission powers assigned to the respective antennas are all 3/12, a transmission power unbalance between the antennas can be solved.

In the second symbol, the transmission powers of the reference signals R3 and R4 are boosted by 1.5 times and the transmission powers for the other data signals are distributed by using Equation 2. Therefore, the transmission powers assigned to the third and fourth antennas are 3/12, respectively as the boosted powers of the reference signals. The transmission powers assigned to the first and second antennas are 3/12, respectively since the transmission powers are distributed by using Equation 2. Therefore, a transmission power unbalance in the second symbol can be solved. In the other symbols including the reference signals, the powers are distributed as described above to overcome the power unbalance problem.

The above Equation 1 and Equation 2 are just examples for distributing data signals to antennas to which reference signals are not assigned. Therefore, various modifications may be made without departing from the scope and spirit of the invention.

2. Rank-2 Transmission

In a 4×2 codebook for 4 antennas, a structure for distributing transmission powers of data signals to third and fourth antennas in symbols including reference signals R1 and R2 is expressed by the following Equation 3. In the newly constructed codebook indicated in Equation 3, the third and fourth rows should satisfy an orthogonal characteristic.

$$W_1 = \begin{bmatrix} 0 & 0 & 0 & 0 \\ 0 & 0 & 0 & 0 \\ 0 & 0 & 1 & 0 \\ 0 & 0 & 0 & 1 \end{bmatrix} \begin{bmatrix} 1 & 1 \\ 1 & -1 \\ 1 & 1 \\ 1 & -1 \end{bmatrix} = \begin{bmatrix} 0 & 0 \\ 0 & 0 \\ 1 & 1 \\ 1 & -1 \end{bmatrix} \quad \text{[Equation 3]}$$

In a 4×2 codebook for 4 antennas, a structure for distributing transmission powers of data signals to first and second antennas in symbols including reference signals R3 and R4 is expressed by the following Equation 4. In the newly constructed codebook indicated in Equation 4, the first and second rows should satisfy an orthogonal characteristic.

$$W_2 = \begin{bmatrix} 1 & 0 & 0 & 0 \\ 0 & 1 & 0 & 0 \\ 0 & 0 & 0 & 0 \\ 0 & 0 & 0 & 0 \end{bmatrix} \begin{bmatrix} 1 & 1 \\ 1 & -1 \\ 1 & 1 \\ 1 & -1 \end{bmatrix} = \begin{bmatrix} 1 & 1 \\ 1 & -1 \\ 0 & 0 \\ 0 & 0 \end{bmatrix} \quad \text{[Equation 4]}$$

Rank-2 is the case where the number of data streams transmitted through each antenna is two. In FIG. 7, when constructing the codebook as shown in Equation 3 and Equation 4 after two data signals are punctured and transmission powers of reference signals are boosted by 1.5 times, a transmission power assigned to each antenna is as follows.

In the first symbol, if the transmission powers of the reference signals R1 and R2 are boosted to 1.5 times, the transmission powers assigned to the first and second antennas are 3/12, respectively. When the transmission power of the data signal is assigned to each antenna by using the codebook constructed as shown in Equation 3, the transmission powers assigned to the first and second antennas are 0, respectively, and the transmission powers assigned to the third and fourth antennas are 3/12, respectively. Thus since the transmission powers assigned to the respective antennas are all 3/12, a transmission power unbalance between the antennas can be solved.

In the second symbol, the transmission powers of the reference signals R3 and R4 are boosted by 1.5 times and the transmission powers for the other data signals are distributed by using Equation 4. Therefore, the transmission powers assigned to the third and fourth antennas are 3/12, respectively as the boosted powers of the reference signals. The transmission powers assigned to the first and second antennas are 3/12, respectively since the transmission powers are distributed by using Equation 4. Therefore, a transmission power unbalance in the second symbol can be solved.

As described above, if the transmission power is distributed by using the codebook configured as indicated in Equation 3 and Equation 4, the power unbalance problem can be overcome. Moreover, in the other symbols including the reference signals, transmission powers are distributed by using Equation 3 and Equation 4 to overcome the power unbalance problem.

The above Equation 3 and Equation 4 are just examples for distributing data signals to antennas to which reference signals are not assigned. Therefore, various modifications may be made without departing from the scope and spirit of the invention. That is, the codebook for rank-2 in the system using 4 antennas may be modified to other forms if the first and second rows in Equation 3 are always orthogonal and the third and fourth rows in Equation 4 are always orthogonal.

While the exemplary embodiments of the present invention have been described for rank-1 and rank-2, it is possible to apply the present invention to the case where the rank is more than 2 according to requirements of an application program or system environments. If the rank is more than 2, orthogonality between rows should be satisfied. Hereinafter, a method of constructing a codebook satisfying this property is described.

One of methods of constructing a codebook partially satisfying orthogonality is as follows.

$$W = \begin{bmatrix} W_{1-2} \\ W_{3-4} \end{bmatrix}, \quad \text{[Equation 5]}$$

$$W_{1-2} = \begin{bmatrix} w_{11} & w_{12} \\ w_{21} & w_{22} \end{bmatrix}, \quad W_{3-4} = \begin{bmatrix} w_{31} & w_{32} \\ w_{41} & w_{42} \end{bmatrix}$$

$$W^H W = \text{diagonal matrix}$$

$$W^H_{1-2} W_{1-2} = \text{diagonal matrix}$$

$$W^H_{3-4} W_{3-4} = \text{diagonal matrix}$$

It is assumed that a codebook matrix W is a 4×2 matrix, that is, rank is 2. In Equation 4, $W_{1-2}$ designates a partial matrix including first and second rows of the matrix W, and $W_{3-4}$ designates a partial matrix including third and fourth rows of the matrix W. $W^H$ is a Hermitian matrix of the matrix W, and indicates that rows and columns of the matrix W are transposed and conjugated by a conjugate number when there is a complex number. That is, H is a symbol representing that, in a square matrix having complex numbers as elements, a matrix of which elements are changed to conjugate numbers and rows and columns are transposed is equal to an original matrix. Therefore, $W^H W$ should satisfy a diagonal matrix. Similarly, $W^H_{1-2} W_{1-2}$ and $W^H_{3-4} W_{3-4}$ are constructed to become diagonal matrixes.

Another example of constructing a codebook by changing codes while partially satisfying orthogonality is shown in Equation 6.

$$W = \begin{bmatrix} W_{1-2} \\ W_{3-4} \end{bmatrix}, \quad \text{[Equation 6]}$$

$$W_{1-2} = \begin{bmatrix} 1 & 1 \\ 1 & 1 \end{bmatrix}, \quad W_{3-4} = \begin{bmatrix} 1 & -1 \\ 1 & -1 \end{bmatrix}$$

$$W^H_{1-2} W_{1-2} = \begin{bmatrix} 2 & 2 \\ 2 & 2 \end{bmatrix} \neq \text{diagonal matrix}$$

$$W^H_{3-4} W_{3-4} = \begin{bmatrix} 2 & -2 \\ -2 & 2 \end{bmatrix} \neq \text{diagonal matrix}$$

In some cases, $W^H_{1-2} W_{1-2}$ and $W^H_{3-4} W_{3-4}$ calculated by using $W_{1-2}$ and $W_{3-4}$ in Equation 6 and the Hermitian matrix in Equation 5 may not satisfy a diagonal matrix. Therefore, it is possible to satisfy the diagonal matrix by changing a sign of one of elements of each of matrixes $W_{1-2}$ and $W_{3-4}$.

The following Equation 7 shows one of methods of changing a sign of one of elements of each of the matrixes $W_{1-2}$ and $W_{3-4}$ in Equation 6.

$$W = \begin{bmatrix} W_{1-2} \\ W_{3-4} \end{bmatrix}, \quad \text{[Equation 7]}$$

Before a sign is changed, $$W_{1-2} = \begin{bmatrix} 1 & 1 \\ 1 & 1 \end{bmatrix}, \quad W_{3-4} = \begin{bmatrix} 1 & -1 \\ 1 & -1 \end{bmatrix}$$

After a sign of one of elements of each matrix is changed, $$W_{1-2'} = \begin{bmatrix} 1 & -1 \\ 1 & 1 \end{bmatrix}, \quad W_{3-4'} = \begin{bmatrix} 1 & -1 \\ 1 & 1 \end{bmatrix}$$

When calculating the Hermitian matrix by changing a sign of any element of a codebook matrix in Equation 7, whether a method of satisfying a diagonal matrix is proper may be checked by the following Equation 8.

$$W^H_{1-2'} W_{1-2'} = \begin{bmatrix} 2 & 0 \\ 0 & 2 \end{bmatrix} = \text{diagonal matrix} \quad \text{[Equation 8]}$$

$$W^H_{3-4'} W_{3-4'} = \begin{bmatrix} 2 & 0 \\ 0 & 2 \end{bmatrix} = \text{diagonal matrix}$$

It is noted in Equation 8 that multiplication of a matrix $W_{1-2}'$ and the Hermitian matrix of the matrix $W_{1-2}'$ is a diagonal matrix, and multiplication of a matrix $W_{3-4}'$ and the Hermitian matrix of the matrix $W_{3-4}'$ is also a diagonal matrix.

Accordingly, if multiplication of any codebook matrix and the Hermitian matrix of the codebook matrix is not a diagonal matrix, a codebook can be configured by changing a sign of one of elements of the any codebook matrix. If a sign of one of elements of the any codebook matrix is changed, a value calculated by Equation 5 should satisfy the diagonal matrix.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a multi-antenna system capable of being applied to various methods for solving a transmission power unbalance between antennas.

The invention claimed is:

1. A method of transmitting data in a multi-antenna system, the method comprising:
   transmitting one or more pilot signals within a first symbol region through a first antenna unit;
   transmitting one or more pilot signals within a second symbol region through a second antenna unit;
   puncturing data of a prescribed number among the data within the first symbol region and the second symbol region; and
   adding a transmission power corresponding to the punctured data to transmission powers corresponding to the pilot signals;
   wherein a prescribed number of data within the first symbol region is transmitted through the second antenna unit,
   wherein a prescribed number of data within the second symbol region is transmitted through the first antenna unit;
   wherein, the prescribed number of data within the first symbol region or the second symbol region is half of a sum of a number of the one or more pilot signals and a number of the prescribed number of punctured data for the corresponding first symbol region or second symbol region;
   wherein, the transmission powers corresponding to the one or more pilot signals transmitted through the first and second antenna units are set higher than the transmission power corresponding to the punctured data by 1.5 times.

2. The method according to claim 1, wherein:
   the first symbol region and the second symbol region include 12 sub-carriers, respectively;
   4 pilot signals are transmitted through the first and second symbol regions; and
   the prescribed number among the data within the first symbol region and the second symbol region is two.

3. The method according to claim 1, wherein transmitting the one or more pilot signals through the first antenna unit comprises transmitting data through the second antenna unit by using a precoding matrix for selecting the second antenna unit.

4. The method according to claim 1, wherein transmitting the one or more pilot signals through the second antenna unit comprises transmitting data through the first antenna unit by using a precoding matrix for selecting the first antenna unit.

5. The method according to claim 1, wherein the first antenna unit includes first and second antennas, and the second antenna unit includes third and fourth antennas.

6. The method according to claim 5, wherein powers assigned to the one or more pilot signals in the first symbol region that are transmitted through the first and second antennas and powers of the one or more pilot signals in the second symbol region that are transmitted through the third and fourth antennas are set higher than powers assigned for data transmission by 1.5 times.

* * * * *